US012723949B2

(12) United States Patent
Dorbala et al.

(10) Patent No.: US 12,723,949 B2
(45) Date of Patent: Sep. 1, 2026

(54) COMPONENT AND SYSTEM FOR REMOTE HEALTH MONITORING

(71) Applicant: General Electric Company, Schenectady, NY (US)

(72) Inventors: Sreekanth Kumar Dorbala, Bangalore (IN); Ravindra Shankar Ganiger, Bangalore (IN); Nicholas Joseph Kray, Mason, OH (US); Karan Oberoi, Bangalore (IN); Debaleena Chakraborty, Bangalore (IN); Wendy Wenling Lin, Montgomery, OH (US)

(73) Assignee: General Electric Company, Evandale, OH (US)

( * ) Notice: Subject to any disclaimer, the term of this patent is extended or adjusted under 35 U.S.C. 154(b) by 94 days.

(21) Appl. No.: 18/173,479

(22) Filed: Feb. 23, 2023

(65) Prior Publication Data

US 2024/0288337 A1 Aug. 29, 2024

(51) Int. Cl.
*G01M 15/02* (2006.01)
*G01M 15/14* (2006.01)

(52) U.S. Cl.
CPC ............ *G01M 15/02* (2013.01); *G01M 15/14* (2013.01)

(58) Field of Classification Search
CPC .............................. G01M 15/02; G01M 15/14
See application file for complete search history.

(56) References Cited

U.S. PATENT DOCUMENTS 5,905,260 A 5/1999 Sage et al.
6,943,699 B2 9/2005 Ziarno
7,231,180 B2 6/2007 Benson et al.
7,571,058 B2 8/2009 Sealing et al.
7,698,075 B2 4/2010 Curry et al.
7,948,147 B2 5/2011 Carralero et al.
(Continued)

OTHER PUBLICATIONS

Iftimie, N., et al. "Wireless sensors for wind turbine blades monitoring." IOP Conference Series: Materials Science and Engineering. vol. 209. No. 1. IOP Publishing, 2017 (Year: 2017).*
(Continued)

*Primary Examiner* — Kara E. Geisel
*Assistant Examiner* — Roberto Fabian, Jr.
(74) *Attorney, Agent, or Firm* — McGarry Bair PC

(57) ABSTRACT

A system for monitoring a health condition of a component is provided. The system includes a sensor network comprising a transmitter and a plurality of receivers. Each receiver is configured to receive an electromagnetic signal from the transmitter. A communications interface module is configured to receive an output signal from the transmitter. A computing system includes one or more memory devices and one or more processors. The one or more memory devices is configured to store instructions that, when executed by the one or more processors, causes the one or more processors to execute operations. The operations include transmitting the electromagnetic signal from the transmitter to the plurality of receivers; receiving the output signal at the communications interface module, wherein the output signal is indicative of an array of the plurality of receivers that received the electromagnetic signal; and determining the health condition based on the output signal to the nominal operating state of the component.

20 Claims, 13 Drawing Sheets

(56) References Cited

U.S. PATENT DOCUMENTS

| | | | | |
|---|---|---|---|---|
| 7,991,587 | B2 * | 8/2011 | Ihn | G01N 29/223 702/183 |
| 8,387,469 | B2 * | 3/2013 | Okoli | G01M 11/08 73/800 |
| 8,706,447 | B2 | 4/2014 | Iannone | |
| 9,255,793 | B2 | 2/2016 | Shibata et al. | |
| 9,567,104 | B2 | 2/2017 | Sweers et al. | |
| 10,280,787 | B2 * | 5/2019 | Pratt | F01D 21/003 |
| 10,724,994 | B2 | 7/2020 | Van Tooren et al. | |
| 10,746,680 | B2 * | 8/2020 | Potyrailo | G01N 27/026 |
| 2013/0332011 | A1 | 12/2013 | Ziarno | |
| 2013/0332025 | A1 | 12/2013 | Ziarno | |
| 2016/0116366 | A1 * | 4/2016 | Da Silva | G01M 7/00 73/579 |
| 2017/0167932 | A1 | 6/2017 | Donskoy et al. | |
| 2020/0249093 | A1 * | 8/2020 | Zeltner | G01J 5/60 |

OTHER PUBLICATIONS

Chandler, Turbine Technology: Read and Weep (for Joy), Radio frequency identification (RFID) devices for aviation maintenance, Aviationpros, 2012. (Web Link) http://www.aviationpros.com/article/10704471/turbine-technology-read-and-weep-for-joy.

Gao et al., Graphene Reinforced Carbon Fibers, Science Advances, vol. 6, No. 17, Apr. 24, 2020, 11 Pages. https://advances.sciencemag.org/content/6/17/eaaz4191#:~:text=Graphene%2C%20a%20single%2Dlayered%20two,storage%2C%20metamaterials%2C%20and%20reinforced%20composite.

Hsiao, Embedded Carbon Fiber Sensor to Monitor Thermal Expansion in a CFRP Composite, ResearchGate, Proceedings of SAMPE TECH 2013, Wichita KS, 2013, 20 Pages. https://www.researchgate.net/publication/288287046_Embedded_carbon_fiber_sensor_to_monitor_thermal_expansion_in_a_CFRP_composite.

Iftimie et al., Wireless Sensors for Wind Turbine Blades Monitoring, IOP Conference Series: Materials Science and Engineering, vol. 209, International Conference on Innovative Research—ICIR Euroinvent 2017, May 25-26, 2017, Iasi Romania, 7 Pages. https://iopscience.iop.org/article/10.1088/1757-899X/209/1/012055/pdf.

RFID Tags—Secure, Encrypted Identification, SkyRFID Inc. (Web Link) http://www.skyrfid.com/RFID_Harsh_Environment_Tag.php https://skyrfid.com/RFID_Tags.php.

Roberti, Delta to Test Tags on Aircraft Engines, RFID Journal, 2005, 6 Pages. https://www.rfidjournal.com/delta-to-test-tags-on-aircraft-engines http://www.rfidjournal.com/articles/view?1477.

Sensor RFID Tags, Energy Harvesting Sensors atlasRFIDstore. (Web Link) *Sensor monitoring RFID tags* https://www.atlasrfidstore.com/sensor-rfid-tags/.

Smiley, Sensor Monitoring with RFID, atlasRFIDstore, Mar. 31, 2016, 6 pages. https://blog.atlasrfidstore.com/sensor-monitoring-rfid.

Wiegler, Baby It's Cold Inside: Smart Appliances & RFID, atlasRFIDstore, 2014, 6 Pages. https://blog.atlasrfidstore.com/baby-cold-inside-rfid-smart-appliances.

* cited by examiner

| | Receiver1 | Receiver2 | Receiver3 | Receiver4 | ... | ReceiverY | | Output Signal | Array |
|---|---|---|---|---|---|---|---|---|---|
| Transmitter1 | 1 | 1 | 1 | 1 | ... | 1 | | Output Signal1 | [1,1,1,1...1] |
| Transmitter2 | 1 | 1 | 1 | 1 | ... | 1 | | Output Signal2 | [1,1,1,1...1] |
| Transmitter3 | 1 | 1 | 1 | 1 | | 1 | | Output Signal3 | [1,1,1,1...1] |
| Transmitter4 | 1 | 1 | 1 | 1 | ... | 1 | | Output Signal4 | [1,1,1,1...1] |
| ... | ... | ... | ... | ... | ... | ... | | ... | ... |
| TransmitterN | 1 | 1 | 1 | 1 | ... | 1 | | Output SignalN | [1,1,1,1...1] |

FIG.5A

| | Receiver1 | Receiver2 | Receiver3 | Receiver4 | ... | ReceiverY | | Output Signal | Array |
|---|---|---|---|---|---|---|---|---|---|
| Transmitter1 | 0 | 0 | 0 | 0 | ... | 0 | | Output Signal1 | [0,0,0,0...0] |
| Transmitter2 | 1 | 1 | 1 | 1 | ... | 1 | | Output Signal2 | [1,1,1,1...1] |
| Transmitter3 | 1 | 1 | 1 | 1 | | 1 | | Output Signal3 | [1,1,1,1...1] |
| Transmitter4 | 1 | 1 | 1 | 1 | ... | 1 | | Output Signal4 | [1,1,1,1...1] |
| ... | ... | ... | ... | ... | ... | ... | | ... | ... |
| TransmitterN | 1 | 1 | 1 | 1 | ... | 1 | | Output SignalN | [1,1,1,1...1] |

FIG.5B

| | Receiver1 | Receiver2 | Receiver3 | Receiver4 | ... | ReceiverY | | Output Signal | Array |
|---|---|---|---|---|---|---|---|---|---|
| Transmitter1 | 0 | 1 | 1 | 1 | ... | 1 | | Output Signal1 | [0,1,1,1...1] |
| Transmitter2 | 0 | 1 | 1 | 1 | ... | 1 | | Output Signal2 | [0,1,1,1...1] |
| Transmitter3 | 0 | 1 | 1 | 1 | | 1 | | Output Signal3 | [0,1,1,1...1] |
| Transmitter4 | 0 | 1 | 1 | 1 | ... | 1 | | Output Signal4 | [0,1,1,1...1] |
| ... | ... | ... | ... | ... | ... | ... | | ... | ... |
| TransmitterN | 0 | 1 | 1 | 1 | ... | 1 | | Output SignalN | [0,1,1,1...1] |

FIG.5C

| | Receiver1 | Receiver2 | Receiver3 | Receiver4 | ... | ReceiverY | | Output Signal | Array |
|---|---|---|---|---|---|---|---|---|---|
| Transmitter1 | 1 | 0.8 | 0.4 | 0.7 | ... | 1 | | Output Signal1 | [1,0.8,0.4,0.7...1] |
| Transmitter2 | 0.9 | 0.8 | 0.2 | 0.5 | ... | 0.8 | | Output Signal2 | [0.9,0.8,0.2,0.5,...0.8] |
| Transmitter3 | 0.8 | 0.6 | 0.4 | 0.6 | | 0.8 | | Output Signal3 | [0.8,0.6,0.4,0.6...0.8] |
| Transmitter4 | 0.9 | 0.8 | 0.5 | 0.7 | ... | 0.9 | | Output Signal4 | [0.9,0.8,0.5,0.7...0.9] |
| ... | ... | ... | ... | ... | ... | ... | | ... | ... |
| TransmitterN | 1 | 0.9 | 0.5 | 0.8 | ... | 1 | | Output SignalN | [1,0.9,0.5,0.8,...1] |

FIG.5D

COMPONENT AND SYSTEM FOR REMOTE HEALTH MONITORING

FIELD

The present subject matter relates generally to sensor networks for engine components. The present subject matter relates particularly to sensor networks for remote health monitoring of engine components.

BACKGROUND

Engines, such as propulsion gas turbine engines for aircraft, include components that are subject to loads, thermal cycles, stresses, and other factors that induce wear, deterioration, or other damage. While some damage may be viewable from a visual inspection, such as a manual walkaround or survey, some components, such as composite components or other layered components, may suffer from delamination of one or more layers of material from one another. Such damage may be difficult to detect from a visual inspection and may require certain tools and techniques to detect damage that is underneath a component surface. Engines may receive routine, periodic maintenance that may detect such damage when the component is removed from the engine. Sensors may detect changes in engine performance that may correlate to certain components.

However, known systems and techniques for determining and monitoring component health may require manual operations, such as removing the component from the engine for a visual inspection or other inspection method. Other known systems and techniques may require wired sensors to relay operational, health, or performance data to a computer. However, wired sensors increase component weight, which reduces engine and aircraft performance. Additionally, wired sensors may suffer from failures associated with detached or deformed wires. Furthermore, wired sensors are generally prohibited from use on rotatable components, such as rotary airfoils or blades. Still further, known systems may not allow for receipt or transmission of health, performance, or operational data until after the engine has shutdown.

As such, there is a need for improved health, performance, and operational monitoring and sensor systems for engine components. Furthermore, there is a need for improved sensor networks for rotatable components such as airfoils.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which:

FIG. 5A is a table depicting an exemplary first operating state of embodiments of the engine and system in accordance with aspects of the present disclosure;

FIG. 5B is a table depicting an exemplary second operating state of embodiments of the engine and system in accordance with aspects of the present disclosure;

FIG. 5C is a table depicting an exemplary third operating state of embodiments of the engine and system in accordance with aspects of the present disclosure;

FIG. 5D is a table depicting an exemplary fourth operating state of embodiments of the engine and system in accordance with aspects of the present disclosure;

Figure 1:
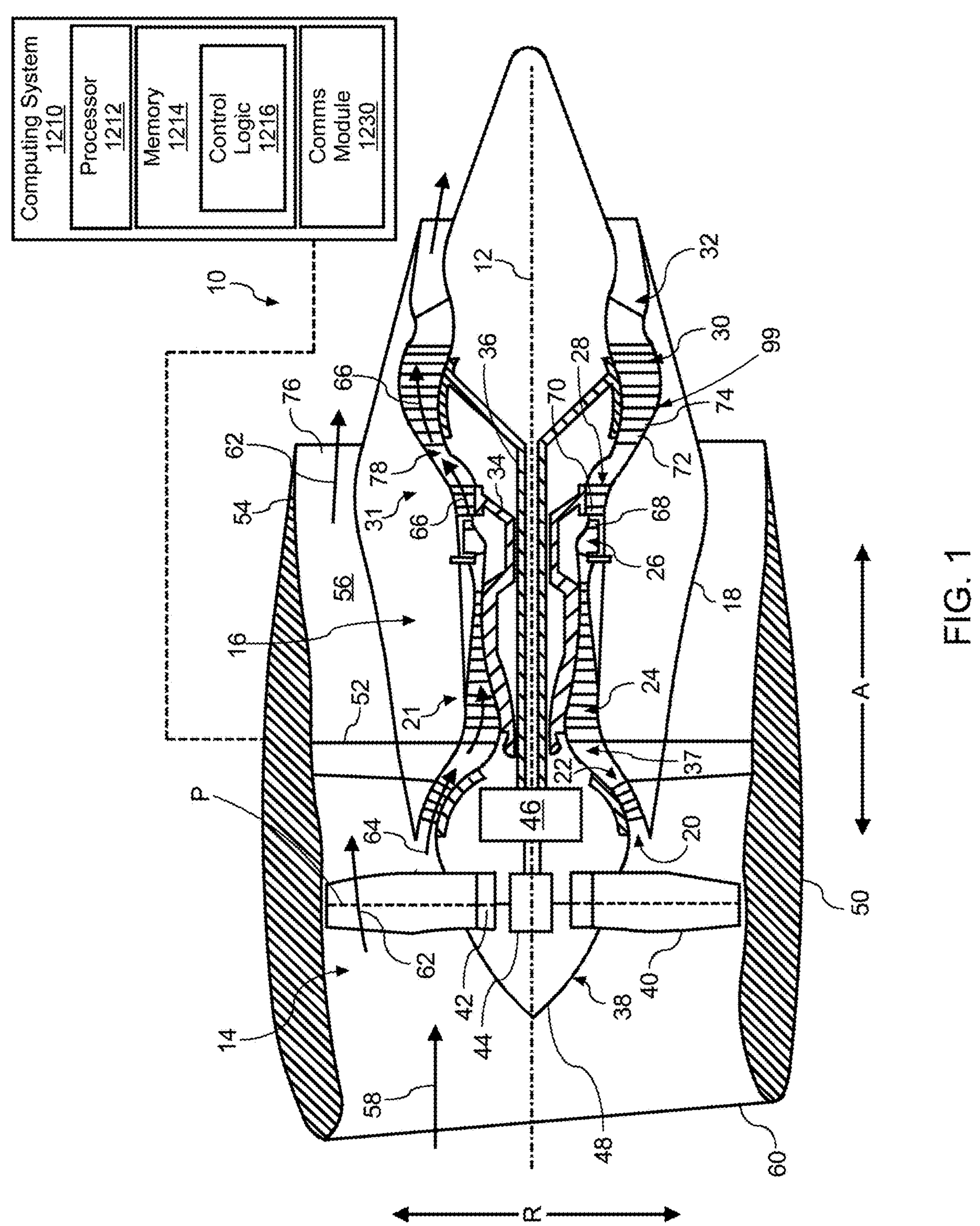
FIG. 1 is a schematic cross-sectional view of an embodiment of a gas turbine engine in accordance with aspects of the present disclosure.

Repeat use of reference characters in the present specification and drawings is intended to represent the same or analogous features or elements of the present disclosure.

DETAILED DESCRIPTION

Reference now will be made in detail to embodiments of the disclosure, one or more examples of which are illustrated in the drawings. Each example is provided by way of explanation of the disclosure, not limitation of the disclosure. In fact, it will be apparent to those skilled in the art that various modifications and variations can be made in the present disclosure without departing from the scope or spirit of the disclosure. For instance, features illustrated or described as part of one embodiment can be used with another embodiment to yield a still further embodiment. Thus, it is intended that the present disclosure covers such modifications and variations as come within the scope of the appended claims and their equivalents.

As used herein, the terms "first", "second", and "third" may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

Embodiments of a system and method for health monitoring and communication for an engine component of a gas turbine engine are provided. Embodiments of the system and method provided herein allow for wireless communication, monitoring, and tracking of the health and performance of engine components. In particular embodiments, the system provided herein allows for real-time monitoring for structural damage to a composite component or other layered structure through self-energizing network of embedded sensors. A particular engine component includes layers of composite fibers with an energy harvesting fiber layered, braided, or woven between the layers of composite fibers, or between outer surfaces of the component, or at the outer surfaces of the component. The energy harvesting fiber, such as a piezoelectric fiber or thermoelectric fiber, extracts energy from loads, pressures, and temperatures applied to the engine component during operation of the engine. The extracted energy is provided to a sensor network within the component. Interruptions in the signal, or particularly the wireless signal, are indicative of damage to the component.

The engine component may include a casing or a rotatable or stationary airfoil, such as a blade or vane. A plurality of sensors is placed within the layers of composite fibers or at a surface of the engine component. The plurality of sensors includes first sensor including a transmitter operably coupled to the energy harvesting fiber to receive energy to transmit an electromagnetic signal. The plurality of sensors further includes a second sensor including a receiver configured to receive the signal from the transmitter. In particular embodiments, the receiver is configured to receive the electromagnetic signal as energy to operate the second sensor and receive a measurement signal, such as a stress, strain, temperature, pressure, or other value indicative of engine component health, performance, deterioration, damage, or generally referred to herein as a health parameter.

The plurality of sensors forms a sensor network configured to extract energy from motion, loads, pressure, temperature, or other operation of the engine component, and to output the electromagnetic signal from the transmitter to the receiver. The transmitter and the receiver, each coupled to one or more composite layers of the engine component, detects and communicates the health parameter of the engine component based on the transmission and reception of the electromagnetic signal. In particular embodiments, the sensor network is a near-field or nonradiative configuration in which the transmitter and the receiver, and the energy transmitted between the transmitter and the receiver, are within a distance of approximately one (1) wavelength of one another. However, it should be appreciated that the sensor network may be configured as any appropriate near-field or nonradiative configuration including any appropriate distance.

With the transmitter and the receiver each coupled to respective portions of the structure of the engine component (e.g., the composite fibers, the structural layers, the outer surfaces, etc.) damage to the respective portion of the structure of the engine component may correspond to damage to the respectively coupled sensor. As such, damage to the transmitter or the receiver is indicative of damage to the engine component. Furthermore, intercommunication of the sensor network, such as via the electromagnetic signal transmitted and received by the sensors, becomes altered or distorted when damage or abnormalities are present in an area between the transmitter and the receiver. In a particular embodiment, such as in a near-field configuration, damage to the component may deteriorate or otherwise alter the electromagnetic signal transmitted from the transmitter. Additionally, or alternatively, damage to the component may deteriorate or otherwise alter the electromagnetic signal received by the receiver. Accordingly, embodiments of a computing system and method for determining, receiving, or monitoring a health parameter at an engine component is provided.

Referring now to the drawings, an exemplary schematic cross-sectional view of an embodiment of an engine 10 having an engine component 99 in accordance with aspects of the present disclosure is provided. The engine 10 defines a reference axial direction A extended co-directional to a longitudinal centerline axis 12. The engine 10 defines a radial direction R extended from the centerline axis 12. A circumferential direction C is defined around the centerline axis 12. In various embodiments, the engine 10 may be configured as a propulsion system for a fixed-wing or rotary wing aircraft. In still various embodiments, the engine 10 is configured as a turbomachine. In a particular embodiment, such as depicted in FIG. 1, the engine 10 is configured as a turbofan engine having a core engine 16 and a fan section 14. Although the fan section 14 is depicted forward or upstream (relative to a flow of air toward the engine 10) of the core engine 16, other embodiments may position the fan section 14 downstream of the core engine 16. Still other embodiments may configure the engine 10 as an open-rotor turbofan engine (i.e., without a nacelle surrounding the fan section 14); a turboprop engine in which the fan section 14 is configured as a propeller assembly; a turboshaft engine in which the core engine 16 is configured to provide horsepower to operate a load device, such as a rotary wing aircraft, power turbine, or a generator; or a combined-cycle engine including a gas turbine engine and a ramjet or scramjet engine. However, it should be appreciated that the component 99 and systems further described herein may be applied to power generating systems and propulsion systems generally.

The exemplary core engine 16 depicted generally includes a substantially tubular outer casing 18 that defines an annular inlet 20. The outer casing 18 encases, in serial flow relationship, a compressor section 21 including a booster or low pressure (LP) compressor 22 and a high pressure (HP) compressor 24; a combustion section 26; a turbine section 31 including a high pressure (HP) turbine 28 and a low pressure (LP) turbine 30; and a jet exhaust nozzle section 32. A high pressure (HP) shaft or spool 34 drivingly connects the HP turbine 28 to the HP compressor 24. A low pressure (LP) shaft or spool 36 drivingly connects the LP turbine 30 to the LP compressor 22. The compressor section 21, combustion section 26, turbine section 31, and nozzle section 32 together define a core gas flowpath 37.

For the embodiment depicted, the fan section 14 includes a variable pitch fan 38 having a plurality of fan blades 40 coupled to a disk 42 in a spaced apart manner. As depicted, the fan blades 40 extend outwardly from disk 42 generally along the radial direction R. Each fan blade 40 is rotatable relative to the disk 42 about a pitch axis P by virtue of the fan blades 40 being operatively coupled to a suitable actuation member 44 configured to collectively vary the pitch of the fan blades 40 in unison. The fan blades 40, disk 42, and actuation member 44 are together rotatable about the centerline axis 12 by LP spool 36 across a power gearbox 46. The power gearbox 46 includes a plurality of gears for adjusting the rotational speed of the fan 38 higher or lower (i.e., greater than or less than 1:1) relative to the LP spool 36 to a more efficient rotational fan speed. However, it should be appreciated that other embodiments of the engine 10 may be configured as a direct-drive engine, in which the LP spool 36 connects the fan blades 40 and the LP turbine 30 in direct drive or 1:1 speed arrangement.

Referring still to the exemplary embodiment of FIG. 1, the disk 42 is covered by a rotatable front hub 48 aerodynamically contoured to promote an airflow through the plurality of fan blades 40. Additionally, the exemplary engine 10 includes an annular fan casing or outer nacelle 50 that circumferentially surrounds the fan 38 and/or at least a portion of the core engine 16. It should be appreciated that the nacelle 50 may be configured to be supported relative to the core engine 16 by a plurality of circumferentially-spaced outlet guide vanes 52. Moreover, a downstream section 54 of the nacelle 50 may extend over an outer portion of the core engine 16 so as to define a bypass airflow passage 56 therebetween. However, in other embodiments, the engine 10 may be configured as an open-rotor engine or turboprop engine, in which fan blades 40 are not surrounded by the nacelle 50 and the bypass airflow passage 56 is generally formed downstream of the fan blades 40 and around the outer casing 18 of the core engine 16.

During operation of the exemplary embodiment of the engine 10 depicted in FIG. 1, a volume of air 58 enters from an upstream end 91 of the engine 10 through an associated inlet 60 of the nacelle 50 and/or fan section 14. Generally, in various embodiments, as the volume of air 58 passes across the fan blades 40, a first portion of the air 58, as indicated by arrows 62, is directed or routed into the bypass airflow passage 56. A second portion of the air 58, as indicated by arrow 64, is directed or routed through the inlet 20 into the core gas flowpath 37, or more specifically into the LP compressor 22. The ratio between the first portion of air 62 and the second portion of air 64 is commonly known as a bypass ratio. The pressure of the second portion of air 64 is then increased as it is routed through the LP compressor 22 and the high pressure (HP) compressor 24. The compressed air then enters into the combustion section 26, where it is mixed with a liquid and/or gaseous fuel and burned to provide combustion gases 66.

The combustion gases 66 are routed through the HP turbine 28 where a portion of thermal and/or kinetic energy from the combustion gases 66 is extracted via sequential stages of HP turbine stator vanes 68 that are coupled to the outer casing 18, and HP turbine rotor blades 70 that are coupled to the HP spool or spool 34, thus causing the HP spool or spool 34 to rotate, thereby supporting operation of the HP compressor 24. The combustion gases 66 are then routed through the LP turbine 30 where a second portion of thermal and kinetic energy is extracted from the combustion gases 66 via sequential stages of LP turbine stator vanes 72 that are coupled to the outer casing 18, and LP turbine rotor blades 74 that are coupled to the LP spool or spool 36, thus causing the LP spool or spool 36 to rotate, thereby supporting operation of the LP compressor 22 and/or rotation of the fan 38.

The combustion gases 66 are subsequently routed through a downstream end 92 of the engine 10 through the jet exhaust nozzle section 32 of the core engine 16 to provide propulsive thrust. Simultaneously, the pressure of the first portion of air 62 is substantially increased as the first portion of air 62 is routed through the bypass airflow passage 56 before it is exhausted from a fan nozzle exhaust section 76 of the engine 10, also providing propulsive thrust. The HP turbine 28, the LP turbine 30, and the jet exhaust nozzle section 32 at least partially define a hot gas path 78 for routing the combustion gases 66 through the core engine 16.

Engines such as those described herein may experience certain magnitudes of vibrations from rotation of one or more shafts, rotors, or flows of fluid, such as air through and within the engine, or fuel to the combustion section 26. In another example, the engine may experience undesired magnitudes of vibration due to a number of issues, including, though not limited to, unbalance in any member of a rotating structure; disruptions in lubricant flow through the engine 10, including loss of lubricant, contaminated lubricant, or defective lubricant flow or pressure; malfunctions in engine valves, including bleed valves, damper valves, pressure valves, or flow control valves; broken, fractured, or delaminated engine components, such as due to foreign or domestic object debris, ice ingestion, bird ingestion, or resulting structural failures; or excessive vibrations due to undesired combustion dynamics.

The component 99, as illustrated, is an airfoil within the turbine section 31 (e.g., one of the LP turbine stator vanes 72, or the LP turbine rotor blades 74). It will be appreciated, however, that the component 99 may be any suitable component within the engine 10. As a non-limiting example, the component 99 can be, but is not limited to, a rotating airfoil or blade forming the fan blade 40, the blades at one or more stages of the LP compressor 22, the blade at one or more stages of the HP compressor 24, a stationary airfoil or vane forming the outlet guide vane 52, the vanes at one or more stages of the LP compressor 22, or the vanes at one or more stages of the HP compressor 24, any one or more struts or vanes in the core gas flowpath 37, or a casing (e.g., such as the nacelle 50, the outer casing 18 of the core engine 16, or the front hub 48 of the fan section 14). The component 99 can include any one or more airfoils, struts, or casings formed of layers of a woven, braided, or layered material. The material may include any one or more appropriate nano-materials, such as, but not limited to graphene, zinc-oxidize (ZnO), or barium titanate (BaTiO3), or one or more composite materials further described herein. In still various embodiments, the Referring still to FIG. 1, in various embodiments the engine 10 includes a computing system 1210 configured to perform operations. The computing system 1210 can generally correspond to any suitable processor-based device, including one or more computing devices. Certain embodiments of the computing system 1210 include a full authority digital engine controller (FADEC), a digital engine controller (DEC), or other appropriate computing device configured to operate the engine 10 in accordance with the manner described above. Additionally, or alternatively, in various embodiments, the computing system 1210 is communicatively coupled to the engine component 99 to perform steps of a method for determining and monitoring a health condition of an engine component (hereinafter, "method 1000"), such as described further below Referring still to FIG. 1, in various embodiments the engine 10 includes a computing system 1210 configured to perform operations. The computing system 1210 can generally correspond to any suitable processor-based device, including one or more computing devices. Certain embodiments of the computing system 1210 include a full authority digital engine controller (FADEC), a digital engine controller (DEC), or other appropriate computing device configured to operate the engine 10 in accordance with the manner described above. Additionally, or alternatively, in various embodiments, the computing system 1210 is communicatively coupled to the engine component 99 to perform steps of a method for determining and monitoring a health condition of an engine component (hereinafter, "method 1000"), such as described further below.

The computing system 1210 may include one or more processors 1212 and one or more associated memory devices 1214 configured to perform a variety of computer-implemented functions, such as one or more steps of the method 1000 described herein. As used herein, the term "processor" refers not only to integrated circuits referred to in the art as being included in a computer, but also refers to a controller, microcontroller, a microcomputer, a programmable logic controller (PLC), an application specific integrated circuit (ASIC), a Field Programmable Gate Array (FPGA), and other programmable circuits. Additionally, the memory devices 1214 can generally include memory element(s) including, but not limited to, computer readable medium (e.g., random access memory (RAM)), computer readable non-volatile medium (e.g., flash memory), a compact disc-read only memory (CD-ROM), a magneto-optical disk (MOD), a digital versatile disc (DVD), non-transitory computer-readable media, and/or other suitable memory elements or combinations thereof.

The computing system 1210 may include control logic 1216 stored in the memory devices 1214. The control logic 1216 may include computer-readable instructions that, when executed by the one or more processors 1212, cause the one or more processors 1212 to perform operations. The instructions can be software written in any suitable programming language or can be implemented in hardware. Additionally, or alternatively, the instructions can be executed in logically and/or virtually separate threads on the one or more processor(s) 1212. The memory device(s) 1214 can further store data that can be accessed by the processor(s), such as steps of the method 1000, or associated charts, lookup tables, schedules, curves, or graphs such as may be described in further detail herein.

Additionally, or separately, the computing system 1210 may also include a communications interface module 1230. In various embodiments, the communications interface module 1230 can include associated electronic circuitry that is used to send and receive a signal, such as depicted schematically via lines 1231 in FIG. 1. As further described below, the signal 1231 corresponds to data received from the sensor network at the component 99, or data sent to the engine 10 for commanding and modulating an operating condition based on the data received from the sensor network, or data to communicate to a network interface the health parameter and overall health condition of the component 99 and engine 10. As such, the communications interface module 1230 can be used to receive data from a sensor network such as described herein. As further provided herein, the communications interface module 1230 may communicate commands, modulations, provisions, or other functions at the engine 10, or receive the health parameter, a voltage state, a current state, or other value indicative of a present or desired operating condition of the component 99 and/or engine 10. In addition, the communications interface module 1230 can also be used to communicate with any other suitable components of the system 1210, including one or more other engines 10, or a vehicle (e.g., fixed or rotary wing aircraft) to which one or more engines 10 is attached.

The computing system(s) 1210 can also include a network interface used to communicate, for example, with the other components of system or apparatus. The network interface can include any suitable components for interfacing with one or more network(s), including for example, transmitters, receivers, ports, controllers, antennas, and/or other suitable components. It should be appreciated that the communications interface module 1230 can be any combination of suitable wired and/or wireless communications interfaces and, thus, can be communicatively coupled to one or more components 99 of the engine 10 via a wired and/or wireless connection. As such, the computing system 1210 may obtain, determine, store, generate, transmit, or operate any one or more steps of the method 1000 described herein via a distributed network. For instance, the network can include a SATCOM network, ACARS network, ARINC network, SITA network, AVICOM network, a VHF network, a HF network, a Wi-Fi network, a WiMAX network, a gatelink network, etc.

Figure 2:
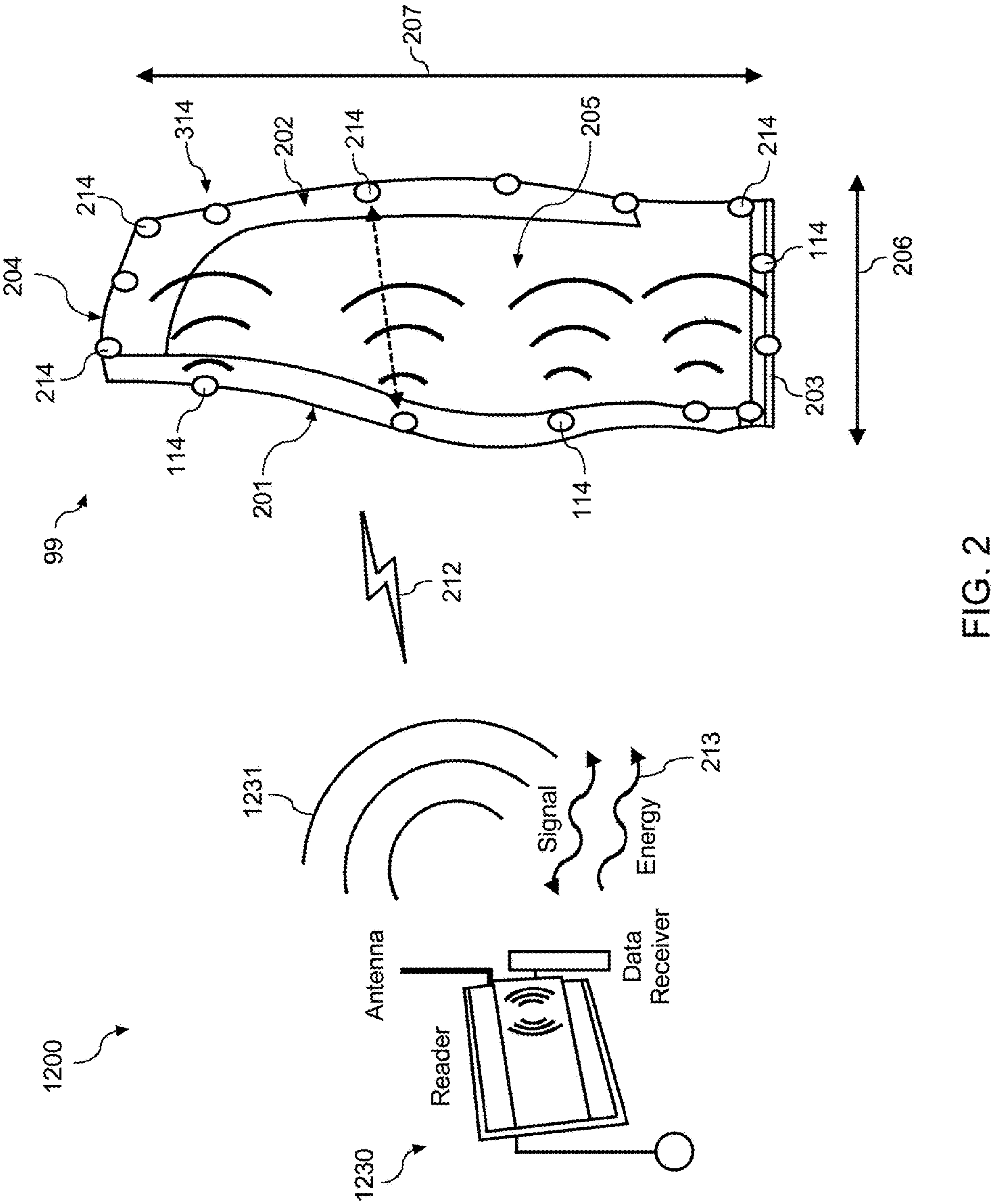
FIG. 2 is a schematic view of an exemplary embodiment of a system for remote health monitoring of a component for an engine in accordance with aspects of the present disclosure.

Referring now to FIG. 2, an exemplary embodiment a system for remote health monitoring of a component is provided (hereinafter, "system 1200"). The system 1200 includes one or more of the engine component 99 such as described herein. The engine component 99 includes a sensor network 314 including an array of transmitters 114 and an array of receivers 214. The sensor network 314 includes one or more transmitters 114 and a plurality of receivers 214. In a particular embodiment, the sensor network 314 includes two or more transmitters 114 and at least an equal quantity of the plurality of receivers 214. Accordingly, a ratio of transmitters 114 to receivers 214 includes a range of 1:1 (i.e., an equal quantity of transmitters and receivers) to 1:N, in which N is greater than 1 (i.e., one transmitter for more than one receiver), such that certain embodiments may include a greater quantity of receivers 214 than transmitters 114. Each receiver 214 is configured to receive an electromagnetic signal emitted from each transmitter 114, such as depicted schematically via lines 211.

In certain embodiments, the transmitter 114 and the receiver 214 is positioned on an outer surface of the component 99, or within one or more layers underneath the surface of the component 99. In various embodiments, the transmitter 114 is positioned at a first region and the receiver 214 is positioned at a second region distal to the first region. Between the first region and the second region is a third region. The first region and the second region may each correspond to edges, tips, roots, perimeters, or outer peripheries of the component 99. The third region is an area, volume, or body between the first region and the second region. Referring to the exemplary embodiment depicted in FIG. 2, the component 99 is configured as an airfoil having a leading edge 201, a trailing edge 202, a root 203, and a tip 204. The airfoil may further include a pressure side and a suction side (not shown). The root 203 may include or form a dovetail structure. In one embodiment, the first region is formed at the leading edge 201 and the second region is formed at the trailing edge 202 distal to the leading edge 201 along a chordwise direction 206. In another embodiment, the first region is formed at the root 203 and the second region is formed at the tip 204 distal to the root 203 along a spanwise direction 207. A body 205 is formed between the first region and the second region, such as between the leading edge 201 and the trailing edge 202, and/or between the root 203 and the tip 204.

In a particular embodiment, the sensor network 314 is a near-field or nonradiative configuration in which the transmitter 114 and the receiver 214, and the energy transmitted between the transmitter 114 and the receiver 214 via the electromagnetic signal 211, are within a distance 111 of approximately one (1) wavelength of one another. Each receiver 214 positioned within the wavelength distance of the transmitters 114 allows the receiver 214 to receive the electromagnetic signal 211 from one or more transmitters 114.

In various embodiments, the transmitter 114 and the receiver 214 may be positioned at any appropriate locations at the component 99. In certain embodiments, the transmitter 114 and the receiver 214 are positioned at the component 99 at any appropriate location separated by the distance 111, such as to form the sensor network 314 as a near-field or nonradiative sensor network.

Additionally, or alternatively, with reference to FIG. 1, it should be appreciated that other embodiments of the component 99 may form the first region at the trailing edge 202 and/or the tip 204, and the second region at the leading edge 201 and/or the root 203. It should be appreciated that the transmitters 114 and the receivers 214 may be positioned at distal ends, perimeters, sides, or faces of the component 99, with the body 205 positioned therebetween. For instance, the component 99 configured as one or more casings such as described above may define the first region at, or proximate to, the upstream end 91 of the engine 10, relative to the second region at, or proximate to, the downstream end 92. Alternatively, the second region may be defined at, or proximate to, the upstream end 91 of the engine 10, relative to the first region at, or proximate to, the downstream end 92. In another instance, the component 99 configured as one or more casings or airfoils such as described above may define the first region at, or proximate to, the centerline axis 12 along the radial direction R relative to the second region at, or proximate to, the centerline axis 12 along the radial direction R. Alternatively, the second region may be defined at, or proximate to, the centerline axis 12 along the radial direction R relative to the first region at, or proximate to, the centerline axis 12 along the radial direction R.

The communications interface module 1230 is configured to receive an output signal from the transmitter 114, such as depicted schematically via lines 212. In certain embodiments, the communications interface module 1230 is further configured to communicate with the transmitters 114 via a component signal 213 sent and received by the communications interface module 1230. The component signal 213 may include the output signal 212 emitted from the transmitters 114. Additionally, the component signal 213 may send energy to operate the transmitters 114.

The output signal 212 from the transmitters 114 is indicative of a quantity, quality, or array of receivers 214 that received the electromagnetic signal 211 from the respective transmitter 114. The sensor network 314 may include quantity N transmitters 114 and quantity Y receivers 214. The sensor network 314 may position each transmitter 114 and each receiver 214 within the wavelength distance 111 of one another, such as to form an N×Y sensor network 314 array configured to transmit and receive the electromagnetic signals 211. Each transmitter 114 is configured to generate the output signal 212 indicative of each receiver 214 that received the respective electromagnetic signal 211.

Figure 3:
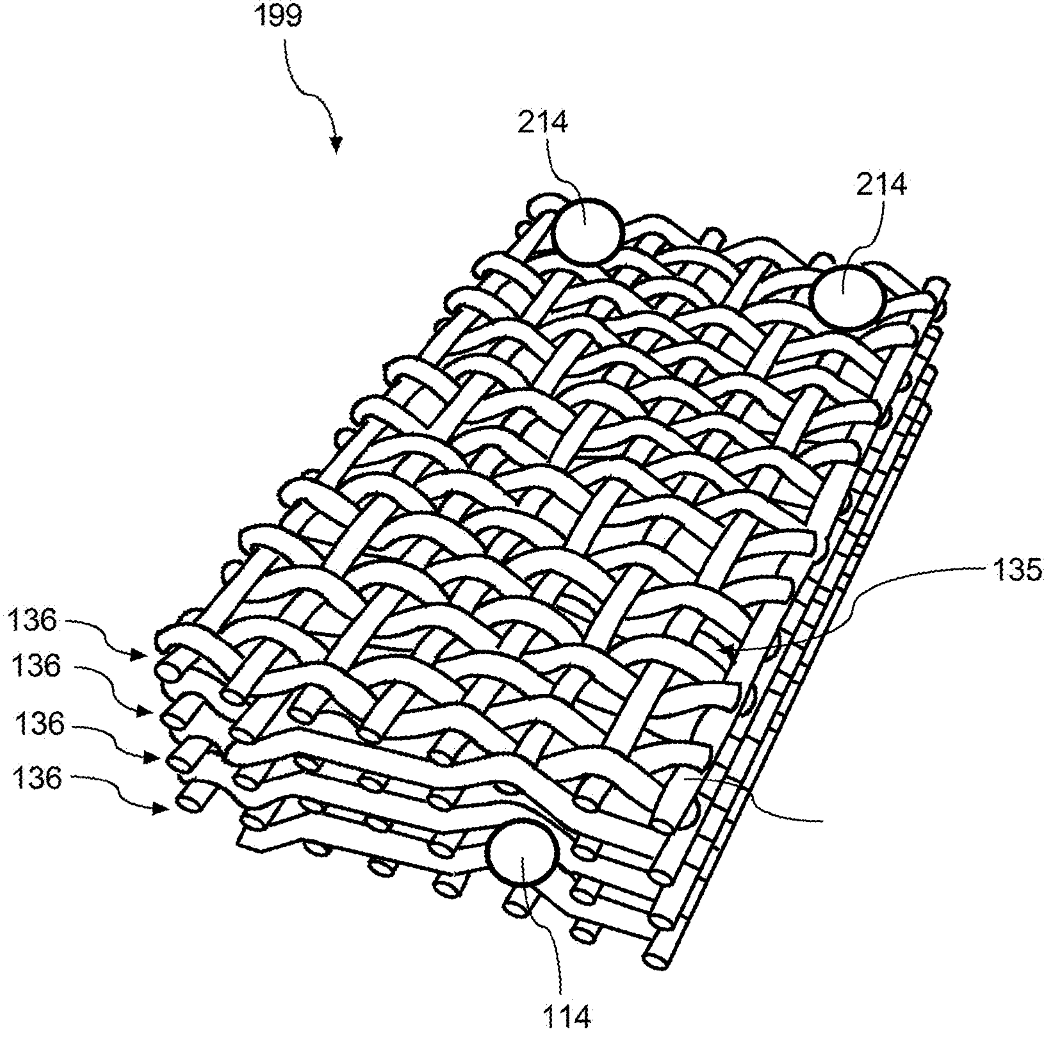
FIG. 3 is a perspective view of a portion of an embodiment of the component in accordance with aspects of the present disclosure.

Referring now to FIG. 3, a perspective view of a portion of an exemplary component 199 including an embodiment of the sensor network 314 is provided. The embodiment provided in regard to FIG. 3 is configured substantially similarly in accordance with the embodiments described with regard to FIGS. 1-2. Accordingly, the view depicted in FIG. 3 may include the component 199 forming a casing or an airfoil such as described herein. In the embodiment depicted in FIG. 3, the component 199 includes a plurality of layers 136 woven, braided, and/or layered with one another. The sensor network 314 including one or more transmitters 114 and one or more receivers 214 is positioned at one or more layers 136 of the component 199. Composite fibers 134 are positioned in at least one layer 136. The composite fibers 134 may extend continuously throughout the entire component 199. However, in other embodiments the composite fibers 134 may extend throughout a portion of the component 199.

In one embodiment, the component 199 includes a matrix 135 and the composite fibers 134 together forming a polymer matrix composite (PMC). Exemplary PMC materials utilized include the matrix 135 defining a polymer-based material. The polymer-based material includes, but is not limited to, a synthetic polymer, a polyepoxide, a polyurethane, or a polyester. In one embodiment, the synthetic polymer includes a solid foamed synthetic polymer containing a synthetic elastomer. In another embodiment, the synthetic elastomer is an elastomeric polyurethane. Fibers 134 embedded within the matrix 135 may include aromatic polyamide classes, or aramids, such as p-phenylene terephthalamides (PPTA) or para-aramids, or ultra-high molecular weight polyethylene, or metal, ceramic, glass, carbon, graphite, boron, nylon, aluminum oxide, or silicon carbide fibers, or mixtures thereof. The fibers 134 may include metallic strands, filaments, particles, whiskers, or fillers.

In another embodiment, the matrix 135 and the composite fibers 134 together form a ceramic matrix composite (CMC). Exemplary CMC materials utilized may include silicon carbide, silicon, silica, carbon, or alumina matrix materials or combinations thereof. Ceramic fibers 134 may be embedded within the matrix 135, such as oxidation stable reinforcing fibers including monofilaments like sapphire and silicon carbide (e.g., Textron's SCS-6), as well as rovings and yarn including silicon carbide (e.g., Nippon Carbon's NICALON®, Ube Industries' TYRANNO®, and Dow Corning's SYLRAMIC®), alumina silicates (e.g., Nextel's 440 and 480), and chopped whiskers and fibers (e.g., Nextel's 440 and SAFFIL®), and optionally ceramic particles (e.g., oxides of Si, Al, Zr, Y and combinations thereof) and inorganic fillers (e.g., pyrophyllite, wollastonite, mica, talc, kyanite and montmorillonite).

In various embodiments, the matrix 135 and the composite fibers 134 are configured as a continuous fiber reinforced PMC or CMC material. For example, suitable continuous fiber reinforced materials may include, but are not limited to, PMC or CMC materials reinforced with continuous carbon fibers, oxide fibers, silicon carbide monofilament fibers and other PMC or CMC materials including continuous fiber lay-ups and/or woven fiber or fabric preforms. In other embodiments, the matrix 135 and the composite fibers 134 are configured as a discontinuous reinforced PMC or CMC material. For instance, suitable discontinuous reinforced PMC or CMC materials may include, but are not limited to, particulate, platelet, whisker, discontinuous fiber, in situ and nano-composite reinforced PMC or CMC materials. In yet other embodiments, the direction of the reinforcing fiber material may be biaxial, unidirectional, triaxial, or any other suitable direction or combination thereof.

Figure 4:
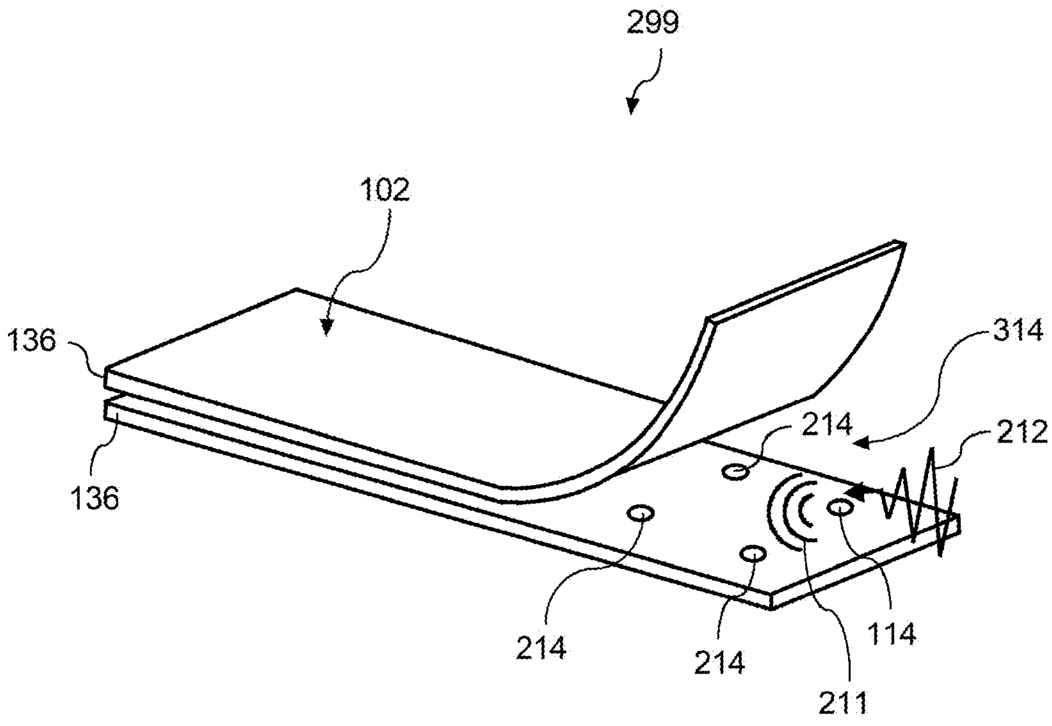
FIG. 4 is a perspective, partially-deconstructed view of an embodiment of the component in accordance with aspects of the present disclosure.

Referring to FIG. 4, a perspective view of a portion of an exemplary component 299 similar to the component 99 (FIG. 2), 199 (FIG. 3). Referring to FIG. 3 and FIG. 4, the component 199, 299 made of a PMC or CMC material may be formed of layers 136 of composite fibers pre-impregnated (pre-preg) with matrix material and may be formed from pre-preg tapes or the like. For example, the component 199, 299 may be formed from a pre-preg tape including a desired ceramic or polymer fiber reinforcement material, one or more precursors of the PMC or CMC matrix material, and organic resin binders. Pre-preg tapes are formed by impregnating the reinforcement material with a slurry that contains the ceramic or polymer precursor(s) and binders. The slurry may contain solvents for the binders that promote the fluidity of the slurry to enable impregnation of the fiber reinforcement material, as well as one or more particulate fillers intended to be present in the ceramic or polymer matrix of the engine component 199, 299, e.g., silicon and/or SiC powders in the case of a Si—SiC matrix. Preferred materials for the precursor will depend on the particular composition desired for the ceramic or polymer matrix of the engine component 199, 299. For example, the precursor material may be SiC powder and/or one or more carbon-containing materials if the desired matrix material is SiC. Carbon-containing materials include carbon black, phenolic resins, and furanic resins, including furfuryl alcohol ($C4H3OCH2OH$).

Referring now to FIG. 4, the component 299 including an embodiment of the sensor network 314 is provided. The embodiment provided in regard to FIG. 4 is configured substantially similarly in accordance with the embodiments described with regard to FIGS. 1-3. Accordingly, the view depicted in FIG. 4 may include the component 299 forming a casing or an airfoil such as described herein. In the embodiment depicted in FIG. 4, the component 299 includes an outer surface 102 surrounding or covering one or more material layers 136. The sensor network 314 including one or more transmitters 114 and one or more receivers 214 is positioned at one or more layers 136 of the component 299.

Referring now to FIGS. 5A-5D, tables depicting exemplary embodiments of operating states of the component 99, 199, 299 of FIGS. 1-4 are provided. FIGS. 5A-5D include respective tables depicting exemplary arrays of transmitters and receivers, and corresponding output signals. FIG. 5A depicts an initial, nominal, or undamaged sensor network, at which each electromagnetic signal from each respective transmitter is receivable by each receiver of the sensor network. A transmitter1 is configured to send an electromagnetic signal1 receivable by receiver1, and furthermore receivable by receiver2, receiver3, receiver4, . . . receiver Y. Similarly, transmitter2 through transmitter N are each configured to send a respective electromagnetic signal2 through electromagnetic signal N receivable by one or more of receiver1, receiver2, receiver3, receiver4, . . . receiver Y. The output signal from each respective transmitter (e.g., output signal1, output signal2, . . . output signal N) includes data corresponding to health parameters indicating which receivers received the electromagnetic signal. Accordingly, in FIG. 5A, a first operating state corresponding to nominal, undamaged operation of the component, output signal1 includes data indicating that receiver1, receiver2, receiver3, receiver4 . . . receiver Y each received electromagnetic signal1. Similarly, output signal N includes data indicating that receiver1, receiver2, . . . receiver Y each received electromagnetic signal N. In one embodiment, the output signal ranges between 0 and 1, inclusively, in which 1 indicates nominal, normal, or full operating condition, and 0 indicates inoperable or complete damage. Accordingly, an array [1,1,1,1 . . . 1] indicates that all transmitters and all receivers are in full operating condition. It should be appreciated that FIGS. 5A-5D depict the electromagnetic signal from each transmitter as being nominally receivable by each receiver. However, other embodiments may be configured to allow the electromagnetic signal to be receivable by fewer than all receivers in a nominal configuration.

FIG. 5B depicts a second operating state of the component 399 of FIGS. 1-4 in which the transmitter1 is inoperable, as indicated by each receiver (i.e., receiver1, receiver2, receiver3, receiver4, . . . receiver Y) fail to receive the electromagnetic signal1 from transmitter1. Accordingly, output signal1 has an array of [0,0,0,0 . . . 0]. It should be appreciated that the communications interface module 1230 (FIGS. 1-2) may not receive a physical output signal, and rather the lack of output signal from transmitter1 is interpreted as having the array of [0,0,0,0 . . . 0], or, in other words, a complete loss of signal. The second operating state of the component 399 described with regard to FIG. 5B may be indicative of damage to the component 399 at the first region at which the transmitter 114 is located, such as depicted and described in FIG. 2. For instance, in regard to FIG. 5B, transmitter1 located at the leading edge 201 depicted in FIG. 2 would be indicative of damage to the component at the leading edge 201. Alternatively, transmitter1 located at the root 203 depicted in FIG. 2 would be indicative of damage to the component at the root 203.

FIG. 5C depicts a third operating state of the component 99, 199, 299 of FIGS. 1-4 in which receiver1 is inoperable, as indicated by each remaining receiver (i.e., receiver2, receiver3, receiver4, . . . receiver Y) has received the respective electromagnetic signals from the respective transmitters. Accordingly, each respective output signal (i.e., output signal1, output signal2, output signal3, output signal4, . . . output signal N) has an array of [0,1,1,1 . . . 1]. The third operating state of the component 399 described with regard to FIG. 5C may be indicative of damage to the component 399 at the second region at which the receiver 214 is located, such as depicted and described in FIG. 2. For instance, in regard to FIG. 5C, receiver1 located at the trailing edge 202 depicted in FIG. 2 would be indicative of damage to the component at the trailing edge 202. Alternatively, receiver1 located at the tip 204 depicted in FIG. 2 would be indicative of damage to the component at the tip 204.

FIG. 5D depicts a fourth operating state of the component 99, 199, 299 of FIGS. 1-4 in which there is damage at the component 99, 199, 299 at a location between one or more transmitters and one or more receivers. In FIG. 5D, each transmitter (i.e., transmitter1, transmitter2, transmitter3, transmitter4, . . . transmitter N) is operable to transmit a respective electromagnetic signal, and each receiver is operable to receive the electromagnetic signal from each transmitter. Referring to FIG. 2, damage at the component 99, 199, 299 at the third region, such as at body 205, may alter or distort the electromagnetic signal received by the receiver 214 relative to the electromagnetic signal transmitted by the transmitter 114. Accordingly, at FIG. 5D, the respective output signals from the respective transmitters may include values greater than zero (0) and less than one (1), indicative of damage at the body 205 (FIG. 2) between the transmitters 114 and receivers 214 (FIG. 2). In various embodiments, the computing system 1210 is configured to determine a location and magnitude of damage at the component 99 based on the output signals generated by the pluralities of transmitters 114 and receivers 214.

Figure 6:
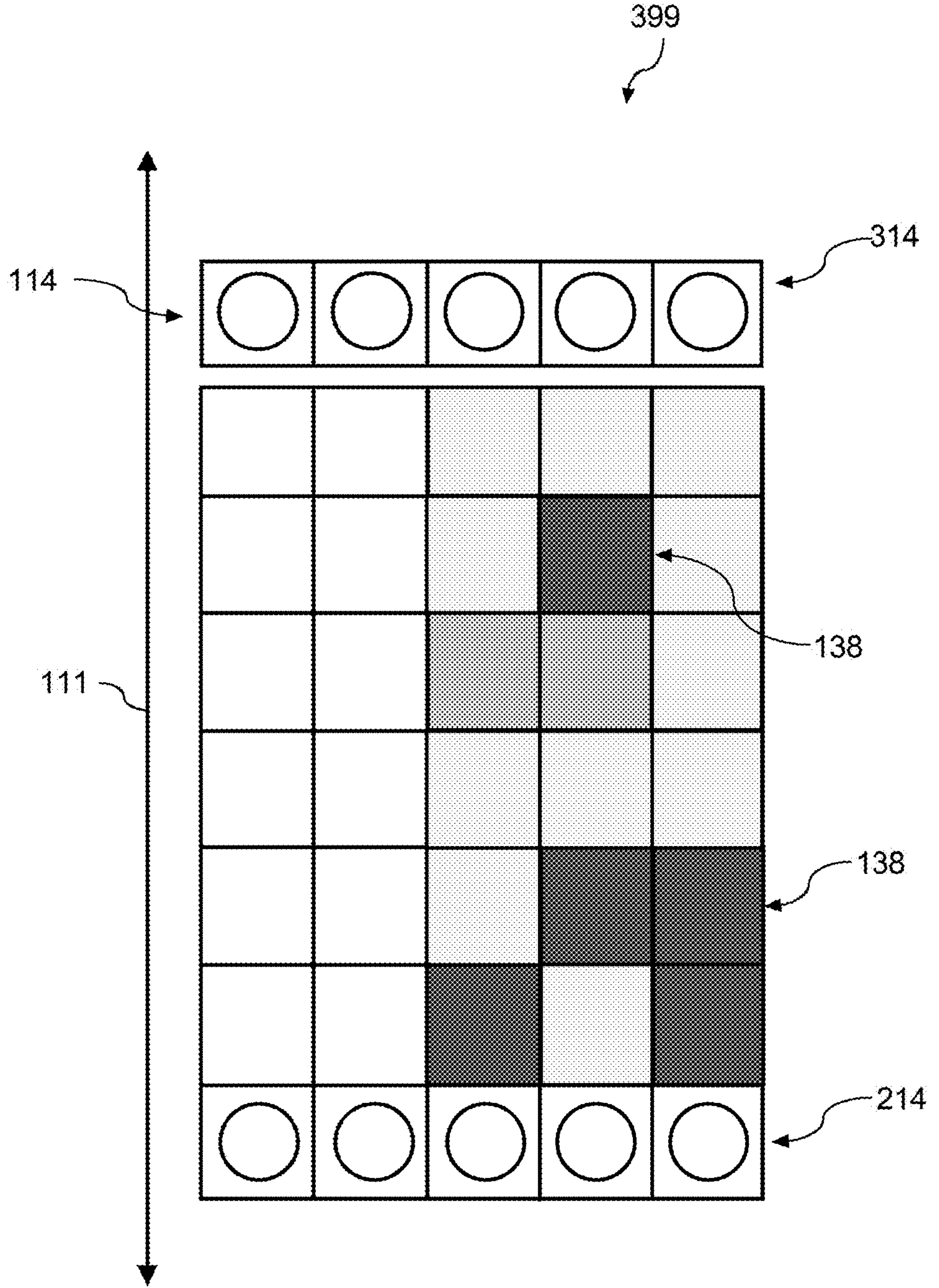
FIG. 6 is an exemplary schematic depiction of damage at the component in accordance with aspects of the present disclosure.

Referring now to FIG. 6, an exemplary schematic depiction of damage at an exemplary component 399. The component 399 is any component described herein such as, but not limited to the component 99 (FIG. 2), the component 199 (FIG. 3), or the component 299 (FIG. 4). The component 399, depicted schematically at area 138, in accordance with the fourth operating state described with regard to FIG. 5D is provided. As depicted and described with regard to FIGS. 1-4 and FIGS. 5A-5D, the component 399 includes the transmitters 114 separated along distance 111 from receivers 214. Between the transmitters 114 and the receivers 214, the component 399 has varying magnitudes and locations of damage 138. The sensor network 314 including the transmitter 114 and the plurality of receivers 214 such as described herein allows for the computing system 1210 to determine the location and magnitude of the damage 138 at the component 399 based on the output signals generated by the transmitters 114.

Figure 7:
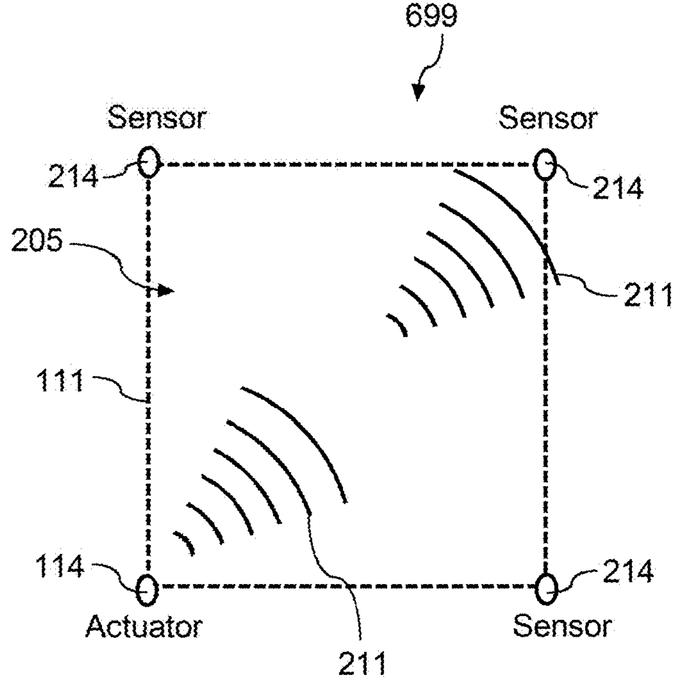
FIG. 7 depicts an exemplary operating state of the system and component in accordance with aspects of the present disclosure.
Figure 8:
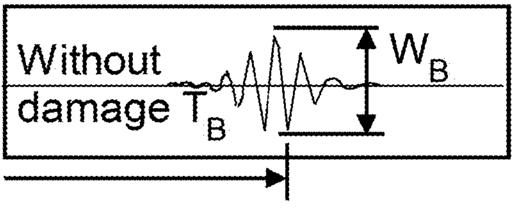
FIG. 8 depicts a graph corresponding to an exemplary operating state of the system and component in accordance with aspects of the present disclosure.

FIGS. 7-10 further illustrate exemplary operating states of the system 1200 and component 699. The component 699 is any suitable component described herein such as but not limited to the component 99 (FIG. 2), component 199 (FIG. 3), or the component 299 (FIG. 6 FIG. 7 depicts a nominal operating state, such as described with regard to the first operating state in regard to FIG. 5A. The transmitter 114 generates the electromagnetic signal 211. The corresponding, unaltered electromagnetic signal 211 is received by the receiver 214. Accordingly, FIG. 8 depicts an exemplary graph depicting a nominal waveform having a nominal amplitude WB and nominal time delay TB.

Figure 9:
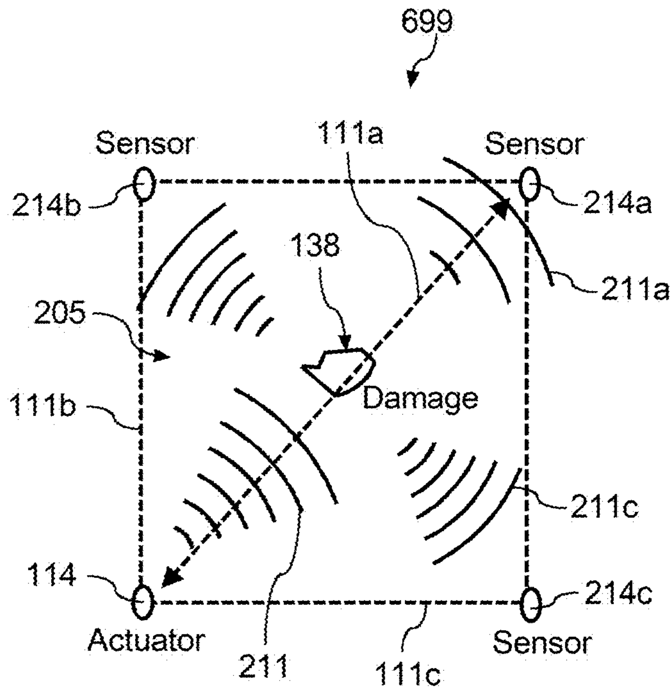
FIG. 9 depicts an exemplary operating state of the system and component in accordance with aspects of the present disclosure.
Figure 10:
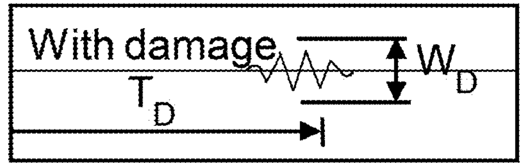
FIG. 10 depicts a graph corresponding to an exemplary operating state of the system and component in accordance with aspects of the present disclosure.

FIG. 9 depicts a damaged operating state of the component 699, such as described with regard to the fourth operating state in regard to FIG. 5D. The transmitter 114 generates the electromagnetic signal 211. However, the damage 138 at the component 699 between the transmitter 114 and the receiver 214*a* alters or distorts the electromagnetic signal received at receiver 214*a*, such as depicted schematically via lines 211*a*. FIG. 10 depicts an exemplary graph depicting an altered waveform relative to the nominal waveform of FIG. 8. The altered waveform includes an altered amplitude WD and altered time delay TD. In particular, the altered waveform may include the altered waveform having a magnitude less than the nominal waveform (e.g., with reference to FIGS. 5A-5D, values less than 1). Furthermore, or alternatively, the altered waveform may include the altered time delay TD being greater than the nominal time delay TB. With reference to FIGS. 5A-5D, the output signal may correlate the increased time delay TD with a value between 0 and 1 (i.e., 1 being nominal, 0 being inoperable, the altered time delay being a value between 0 and 1). Accordingly, the output signal corresponding to the transmitter 114 and receiver 214*a* will have a reduced, altered, or distorted signal (e.g., between 0 and 1 in FIGS. 5A-5D), such as described with regard to FIG. 5D. Additionally, the distorted signal 211*a* may correspond to distance 111*a* between the transmitter 114 and the receiver 214*a*. In various embodiments, the damage 138 may generate distortion in the electromagnetic signals 211*b*, 211*c* received by respective receivers 214*b*, 214*c*. Accordingly, the respectively generated signals 211*b*, 211*c* may be correspond to respective distances 111*b*, 111*c* between the transmitter and the respective receiver 214*b*, 214*c*. The location and magnitude of the damage 138 relative to receiver 214*a*, along distance 111*a*, generates a greater signal distortion in contrast to receivers 214*b*, 214*c* along respective distances 111*b*, 111*c*. Accordingly, the positions of the receivers 214*a*, 214*b*, 214*c* relative to the transmitter 114 and the respective magnitudes of electromagnetic signals 211*a*, 211*b*, 211*c* received at the respective receivers 214*a*, 214*b*, 214*c* allow for the computing system 1210 (FIG. 1) to determine the location of the damage 138 at the component 699.

Figure 11:
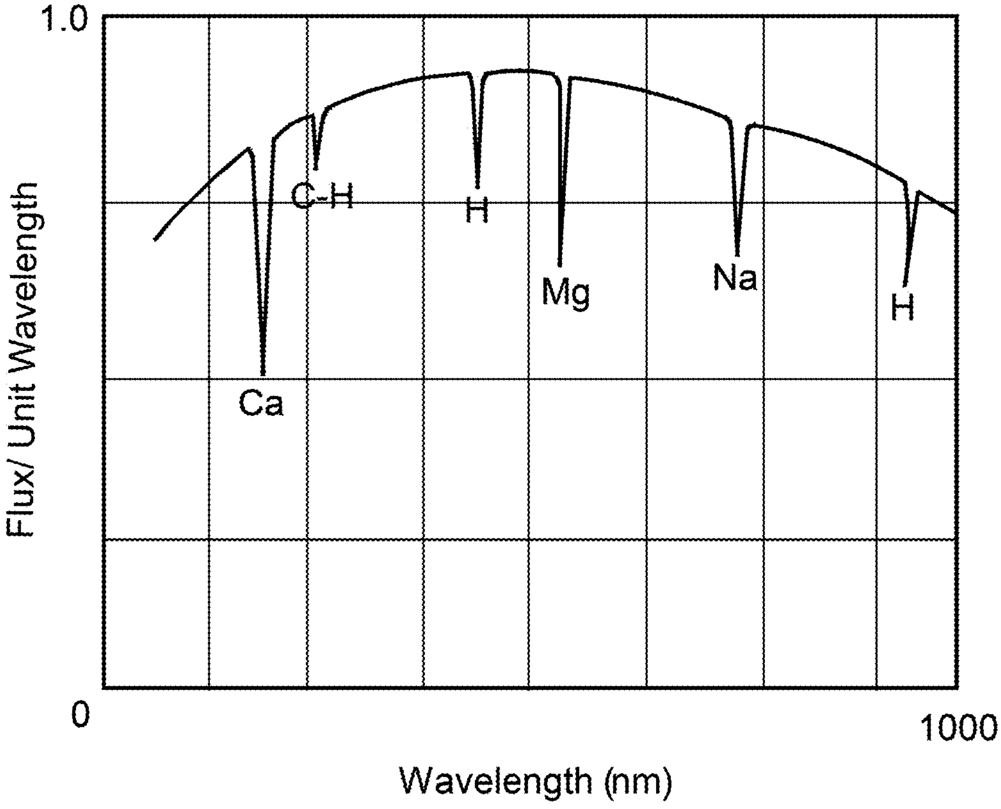
FIG. 11 depicts an exemplary graph corresponding to a condition of the component of the system in accordance with aspects of the present disclosure.

Embodiments of the system 1200 provided herein may store charts, graphs, tables, schedules, curves, or other data indicative of a nominal condition of the component 99, 199, 299, 399, 699 such as described with regard to FIG. 5A. Referring to FIG. 11, an exemplary embodiment of a graph 1100 corresponding to a nominal condition of the component 99, 199, 299, 399, 699 is provided. In one embodiment, the graph 1100 is a spectroscopy of the component 99, 199, 299, 399, 699. In particular embodiments, the graph 1100 is an impedance spectroscopy corresponding to the ability of the component 99, 199, 299, 399, 699, in an undamaged operating state, to impede the transmission of electromagnetic energy. In other embodiments, the graph 1100 may define an absorption spectroscopy corresponding to a magnitude of electromagnetic energy absorbed by the component 99, 199, 299, 399, 699. In still another embodiment, the graph 1100 may define an elastic scattering or reflection, corresponding to reflection or scattering of electromagnetic energy by the component 99, 199, 299, 399, 699. In still other embodiments, the graph 1100 may correspond to any appropriate spectroscopy method.

The graph 1100 may generally set the changes or flux per unit wavelength versus wavelength. Different elements within the material of the component 99, 199, 299, 399, 699 will result in different values of flux versus wavelength. In a nominal or undamaged operating state, the values represented by the graph 1100 may be normalized to one (1), such as depicted in FIG. 5A. As the component 99, 199, 299, 399, 699 undergoes wear, deterioration, or fatigue, such as through cyclic use as described herein, or damage 138 such as described herein, the spectroscopy of the component 99, 199, 299, 399, 699 will alter or distort. Accordingly, the values represented in FIG. 5D may reflect changes in spectroscopy relative to the nominal state depicted in FIG. 5A.

Figure 12:
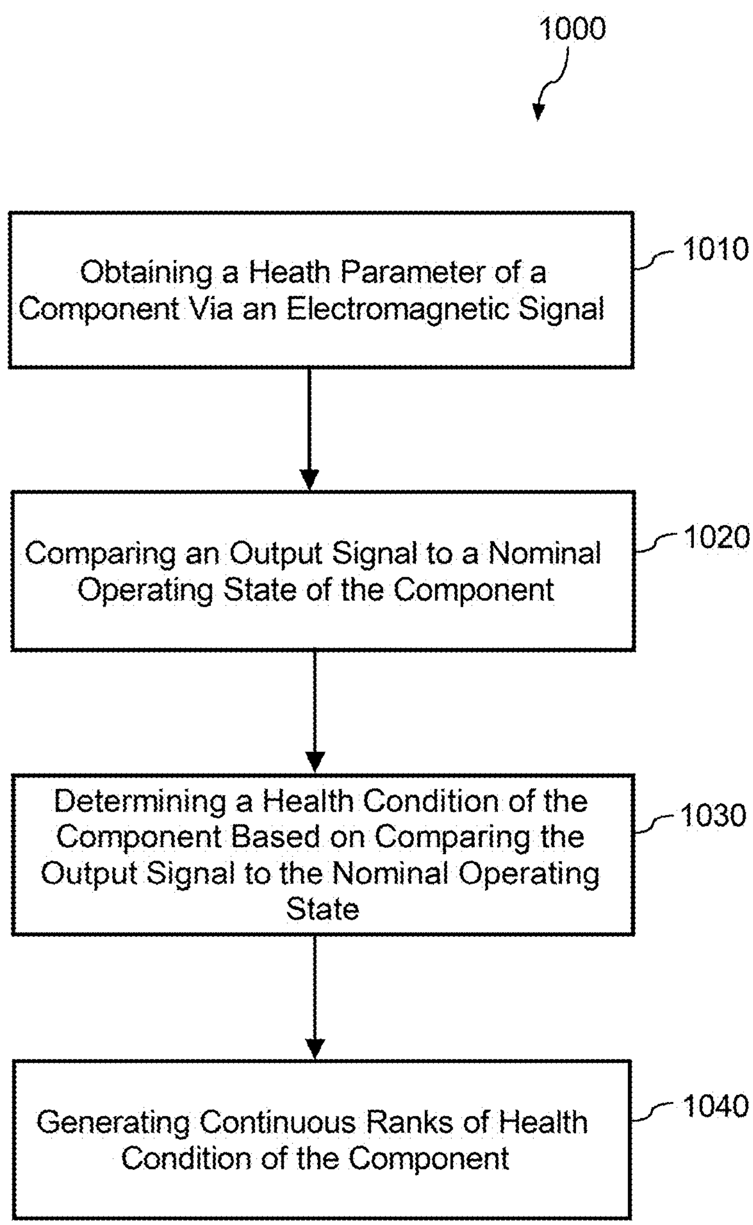
FIG. 12 is a flowchart outlining exemplary steps of a method for determining and monitoring a health condition of a component in accordance with aspects of the present disclosure.

Referring now to FIG. 12, a flowchart outlining steps of a method for determining and monitoring a health condition of an engine component are provided ("method 1000"). Steps of the method 1000 provided may be stored and/or executed as operations by various embodiments or combinations of the computing system 1210, the communications interface module 1230, the component 99, 199, 299, 399, 699, and the engine 10 depicted and described herein with regard to FIGS. 1-11. The method 1000 provided herein may be stored as computer-readable instructions stored in the control logic 1216 of the computing system 1210. Steps of the method 1000, when stored as instructions, may be executed by one or more processors 1212 to cause the computing system 1210, the engine 10, the component 99, 199, 299, 399, 699, or portions thereof (e.g., the sensor network 314, the communications interface module 1230, etc.) to perform operations. However, it should be appreciated that steps of the method 1000 may be performed by any appropriate computing system, communications interface module, component, or sensor network, or in accordance with any one or more embodiments, or combinations thereof, depicted or described in the present disclosure.

The method 1000 includes at 1010 obtaining a health parameter of a component via an electromagnetic signal. The method 1000 at 1010 may obtain the health parameter via transmitting the electromagnetic signal from a transmitter positioned on or within the component and within a distance of one or more receivers such as described herein with regard to the sensor network 314 at the component 99, 199, 299, 399, 699. In certain embodiments, the method 1000 at 1010 allows a wireless sensor (e.g., transmitter 114 or receiver 214) to capture an element composition of the component 99, 199, 299, 399, 699, such as a spectroscopy including spectroscopy wavelengths such as described with regard to FIG. 11.

The method 1000 includes at 1020 comparing an output signal to a nominal operating state of the component. In one embodiment, the computing system 1210 compares the output signal 212 received from the transmitter 114 to the nominal operating state of the component 99, 199, 299, 399, 699, such as described with regard to FIG. 5A, FIGS. 7-8, and/or FIG. 11. In certain embodiments, the method 1000 at 1020 compares spectroscopy wavelengths obtained in step 1010 to the nominal operating state or nominal spectroscopy, such as described with regard to FIG. 11.

The method 1000 includes at 1030 determining a health condition at the component based on comparing the output signal to the nominal operating state. In a particular embodiment, determining the health condition includes determining a magnitude and location of distress, deterioration, wear, or damage (e.g., damage 138) at the component 99, 199, 299, 399, 699 based on comparing the obtained spectroscopy wavelengths in step 1010 to the nominal operating state or nominal spectroscopy as may be stored at the computing system 1210. In certain embodiments, the computing system 1210 may store predetermined, discrete operating states of the component 99, 199, 299, 399, 699 corresponding to various magnitudes of distress, wear, deterioration, or damage. Such predetermined operating states may be obtained via one or more methods of image spectroscopy and compared to a discrete ranking scale of distress.

The method 1000 includes at 1040 generating a continuous rank of health condition of the component. In a particular embodiment, generating the continuous rank of the health condition of the component includes comparing the determined health condition to the discrete ranking scale of distress. Comparing the determined health condition to the discrete ranking scale of distress may include any appropriate type of numerical analysis of estimation to generate outputs within a range of, or between, the discrete ranking scales of distress. Such numerical analysis may include interpolation or extrapolation between two or more discrete rankings, or from one or more discrete rankings.

Accordingly, the method 1000 at 1040 may allow for determining a magnitude of distress at the component based on one or more known operating states. The method 1000 at 1040 may result in arrays such as depicted and described with regard to FIG. 5D. For instance, the method 1000 at 1040 allows for the computing system 1210 to generate an operating state signal indicative of a magnitude and/or location of wear, deterioration, distress, or damage at the component, in which the operating state signal is in comparison to one or more known, discrete rankings of distress. For instance, with regard to FIG. 5A, the exemplary arrays of output signal correspond to a nominal operating state, while FIG. 5B and FIG. 5C each correspond to different types, scales, rankings, magnitudes, or locations of distress. FIG. 5D corresponds to any one or rankings of distress along a continuous scale between discrete rankings (e.g., a continuous scale between 0 and 1).

Accordingly, the system 1200, the component 99, 199, 299, 399, 699, and the method 1000, or combinations of portions thereof, allows for determination of structural distress, wear, deterioration or other damage in composite structures or layered structures via the sensor network 314 described herein. Wireless sensors may reduce or eliminate complex wiring from the component 99, 199, 299, 399, 699 to the communications interface module 1230. Distress monitoring and tracking may be determined, or furthermore refined, via the continuous rankings rather than discrete rankings (e.g., complete failure or nominal operating state), subjective visual determinations by human operators, or estimations based on cyclic use (i.e., distress determinations based only, or substantially only, on a quantity of cycles the component has received) rather than component condition.

Figure 13:
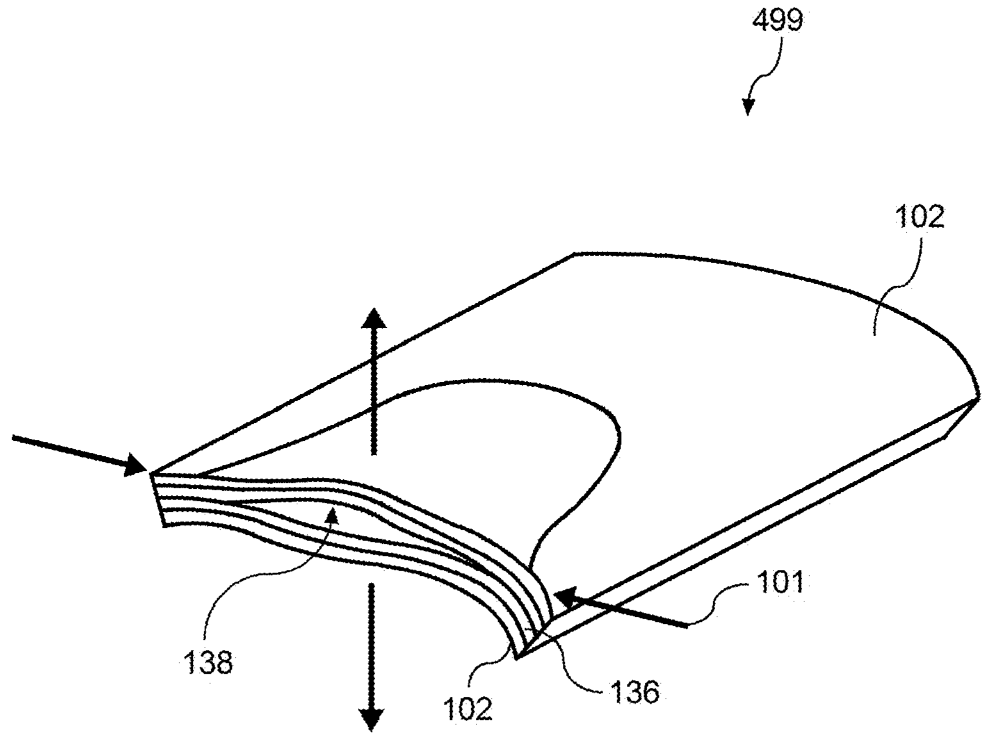
FIG. 13 is a perspective view depicting exemplary damage to an embodiment of the component in accordance with aspects of the present disclosure.

Referring now to FIG. 13, a perspective view of an exemplary embodiment of the component 499 having damage 138 is provided. The component 499 is any component described herein such as, but not limited to the component 99 (FIG. 2), the component 199 (FIG. 3), the component 299 (FIG. 4), the component 399 (FIG. 6), to the component 699 (FIG. 7). In FIG. 13, the damage 138 is defined by separation, fiber failure, material degradation, or delamination of one or more layers 136 from one another, or from the surface 102. Compressive or tensive loads, depicted schematically via arrows 139, or shear loads, may be applied at particular portions of the component 499, which may lead to damage 138. Damage 138 may occur as a result of cyclic exposure of the component 499 to various thermal gradients, pressure changes, vibrations, oscillations, forces, or combinations thereof.

In one embodiment of the engine 10 and an exemplary operating state, the component 499 defined by the fan blades 40, the nacelle 50, the front hub 48, the outlet guide vane 52, or other casings or airfoils described herein, may receive damage 138 via foreign object debris striking the engine 10 while in motion. Exemplary foreign object debris may include a bird strike or ice ingestion in which a bird or accumulated icing impacts the component 499 during aircraft takeoff, climb-out, approach, or other maneuvers. During such conditions, by way of example, the debris may strike the component 499 at a speed of about 200 knots or more and may result in damage 138.

Figure 14:
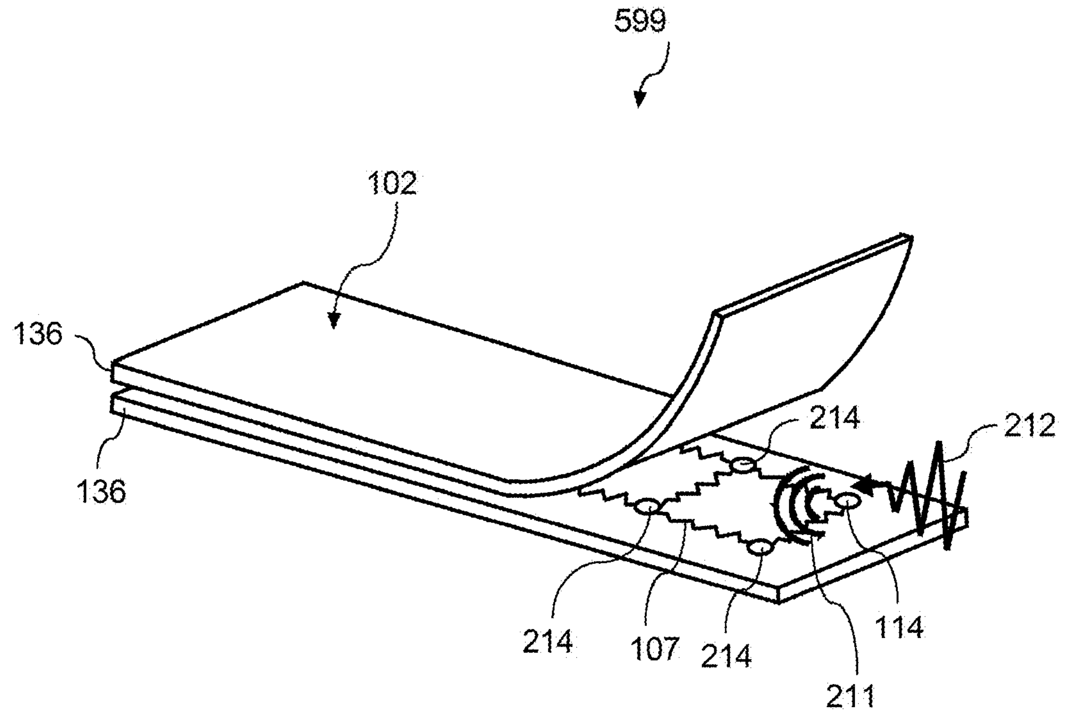
FIG. 14 is a perspective, partially-deconstructed view of an embodiment of the component in accordance with aspects of the present disclosure.

Referring now to FIG. 14, perspective view of an exemplary embodiment of the component 599 is provided. The component 499 is any component described herein such as, but not limited to the component 99 (FIG. 2), the component 199 (FIG. 3), the component 299 (FIG. 4), the component 399 (FIG. 6), the component 699 (FIGS. 7-9) or the component 499 (FIG. 13). The embodiment provided with regard to FIG. 14 is configured substantially similarly as described with regard to FIGS. 1-13. In FIG. 14, the component 599 includes an energy harvesting fiber 107. The energy harvesting fiber 107 may include a piezoelectric fiber. In the embodiment provided in FIG. 14, the piezoelectric fibers are configured to utilize pressure changes or vibrations at the component 599 to provide power to one or more sensors of the sensor network 314. In particular embodiments, the energy harvesting fiber 107 includes piezoelectric materials characterized by the piezoelectric effect, which is when an electric charge is generated in response to an applied mechanical stress, such as schematically depicted in FIG. 13 via arrows 101. The applied mechanical stress may include a force of fluid across the component 599. In one embodiment, one or more sensors of the sensor network 314 is configured as a piezoelectric transducer integrated on the surface 102 or within one or more layers 136 of the component 599. The sensor network 314 configured as a piezoelectric transducer outputs a voltage that is directly proportional to the applied force, pressure, or strain induced on the component 599. An output voltage may be compared to a known value for typical, safe, or nominal operation of the engine 10 and component 599, such as described above. The compared value can then be set to a limit within a performance and health monitoring analytics regime associated with the engine 10, such as described above.

Energy harvesting fibers that are integrated into the component 599 such as described herein may additionally, or alternatively, be configured to act as a vibration dampener.

Such embodiments may improve performance of the engine 10 by controlling or attenuating undesired vibratory modes. In an embodiment, the sensor network 314, including the energy harvesting fiber 107, receives mechanical energy, such as forces 101 (FIG. 13) due to engine operation, or foreign or domestic object damage or strikes onto the engine, and converts the forces 101 (FIG. 13) to electrical energy that is distributed through the sensor network 314. In a particular embodiment, the sensor network 314 provided herein receives any one or more signals 211, 213 and applies a reversed piezoelectric effect by applying an electric current to the energy harvesting fiber 107 including the piezoelectric fiber. Accordingly, the energy harvesting fiber 107 integrated into the component 599 can have desirable mechanical deformation to offset deformation or damage caused to the component 599. The electrical coupling of sensor network 314 and the energy harvesting fiber 107 may allow for the piezoelectric fiber to desirably offset or attenuate the vibrations experienced by the component 599 during operation of the engine 10.

Exemplary sensors of the sensor network 314 provided herein, such as the transmitter 114 and receiver 214, may be formed of one or more nano-materials interspersed within composite materials. The sensors may be 8-mil or less thick when applied to the component 99, 199, 299, 399, 499, 599, 699. The sensors described herein may be compatible with epoxy resins, allowing for relatively high-stress or high-temperature environments. Particular embodiments allow for placement of the sensor network 314 at areas of the component 99, 199, 299, 399, 499, 599, 699 that may be more susceptible to damage, such as dovetail fibers, spars or internal load-carrying members, or root 203 of an airfoil, or portions more likely to receive domestic or foreign object debris damage, such as particular spans of the airfoil (e.g., from 10% span [proximate to root 203] to 100% span [proximate to tip 204] of an airfoil) at which birds, ice, hail, or other debris may cause damage.

Embodiments of the engine 10, system 1200, and component 99, 199, 299, 399, 499, 599, 699 provided herein allow for identifying stress levels in mechanical components via spectroscopy, and outputting continuous distress ranks. The continuous stress ranks allow for building analytical models for component health and performance. Embodiments provided herein allow for real-time determination of component health, operational state, and performance. The engine 10, system 1200, and component 99, 199, 299, 399, 499, 599, 699 provided herein may include active or passive wireless, self-exciting transmitters 114 and receivers 214. Embodiments provided herein may be utilized with, or in lieu of, visual monitoring, video, or imaging inspection systems and methods. The system 1200 and component 99, 199, 299, 399, 499, 599, 699 provided herein allows for reduced weight and complexity by minimizing or eliminating cable routing between sensors, or between sensors and power sources. Embodiments provided herein further allow for improved engine performance by real-time health, operation, and performance monitoring, allowing for real-time adjustments in operating condition, or more precise maintenance schedules based on real-time data acquisition. Furthermore, embodiments provided herein allow for health monitoring of composite structures, such as to determine early stages of delamination prior to visual or surface-level indications of delamination.

This written description uses examples to disclose the preferred embodiments, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

Further aspects of the disclosure are provided by the subject matter of the following clauses:

1. A system for monitoring a health condition of a component, the system comprising a sensor network comprising a transmitter and a plurality of receivers, wherein each receiver is configured to receive an electromagnetic signal from the transmitter; a communications interface module configured to receive an output signal from the transmitter; and a computing system comprising one or more memory devices and one or more processors, wherein the one or more memory devices is configured to store instructions that, when executed by the one or more processors, causes the one or more processors to execute operations, the operations comprising transmitting the electromagnetic signal from the transmitter to the plurality of receivers; receiving the output signal at the communications interface module, wherein the output signal is indicative of an array of the plurality of receivers that received the electromagnetic signal; and determining the health condition based on the output signal to the nominal operating state of the component.
2. The system of one or more of these clauses, wherein the electromagnetic signal obtains a spectroscopy of the component.
3. The system of one or more of these clauses, the operations comprising:

determining the health condition based on comparing the output signal to a nominal operating state of the component.

4. The system of one or more of these clauses, wherein comparing the output signal to the nominal operating state comprises comparing the spectroscopy obtained by the electromagnetic signal to a nominal spectroscopy corresponding to the nominal operating state.
5. The system of one or more of these clauses, wherein the health condition comprises a magnitude and location of damage at the component within a distance between the transmitter and the plurality of receivers.
6. The system of one or more of these clauses, the operations comprising:

generating a continuous rank of the health condition of the component based at least on comparing the health condition to a discrete ranking scale of distress.

7. The system of one or more of these clauses, wherein the discrete ranking scale of distress comprises one or more known operating states of the component, and wherein generating the continuous rank of the health condition comprises a numerical analysis of the health condition to the discrete ranking scale of distress.
8. The system of one or more of these clauses, wherein the sensor network is a near-field configuration of the transmitter and the plurality of receivers.
9. A gas turbine engine, the engine comprising: a component comprising a surface and a plurality of layers of material, wherein a sensor network is positioned at one or more of the surface of the plurality of layers of the component, wherein the sensor network comprises a transmitter and a plurality of receivers, and wherein each receiver is configured to receive an electromagnetic signal from the transmitter; a computing system comprising: a communications interface module configured to receive an output signal from the transmitter; and a computing system comprising one or more memory devices and one or more processors, wherein the one or more memory devices is configured to store instructions that, when executed by one or more processors, causes the one or more processors to execute operations, the operations comprising: transmitting the electromagnetic signal from the transmitter to the plurality of receivers; receiving the output signal at the communications interface module, wherein the output signal is indicative of an array of the plurality of receivers that received the electromagnetic signal; and determining a health condition based on comparing the output signal to the nominal operating state of the component.

10. The engine of one or more of these clauses, wherein the component is an airfoil comprising a leading edge, a trailing edge, a root, and a tip, and wherein the transmitter is positioned at a first region comprising one or both of the leading edge and the root, and wherein the plurality of receivers is positioned at a second region comprising one or both of the trailing edge and the tip.

11. The engine of one or more of these clauses, wherein the component is a casing comprising a first region at an upstream end of the casing and a second region at a downstream end of the casing, and wherein the transmitter is positioned at the first region and the plurality of receivers is positioned at the second region.

12. The engine of one or more of these clauses, wherein the component comprises composite fibers positioned in at least one layer of material, and wherein at least a portion of the transmitter, one or more of the plurality of receivers, or both, are positioned at the composite fibers.

13. The engine of one or more of these clauses, wherein the component comprises an energy harvesting fiber at the composite fibers, and wherein the energy harvesting fiber is operably coupled to the transmitter, the plurality of receivers, or both, to provide energy to the sensor network.

14. The engine of one or more of these clauses, wherein the sensor network is a near-field configuration of the transmitter and the plurality of receivers.

15. The engine of one or more of these clauses, wherein the electromagnetic signal obtains a spectroscopy of the component, and wherein comparing the output signal to the nominal operating state comprises comparing the spectroscopy obtained by the electromagnetic signal to a nominal spectroscopy corresponding to the nominal operating state.

16. The engine of one or more of these clauses, the operations comprising:

generating a continuous rank of the health condition of the component based at least on comparing the health condition to a discrete ranking scale of distress.

17. A computer-implemented method for monitoring a health condition of an engine component, the method comprising: transmitting, via one or more transmitters positioned at the engine component, an electromagnetic signal to a plurality of receivers positioned at the engine component; receiving, via a communications interface module, an output signal from the one or more transmitters, wherein the output signal is indicative of an array of the plurality of receivers that received the electromagnetic signal; determining, via the one or more processors, the health condition based on comparing the output signal to the nominal operating state of the component.

18. The method of one or more of these clauses, the operations comprising: obtaining, via the electromagnetic signal, a spectroscopy of the component; and comparing, via the processor, the spectroscopy obtained by the electromagnetic signal to a nominal spectroscopy corresponding to the nominal operating state.

19. The method of one or more of these clauses, the method comprising: comparing, via the one or more processors, one or more known operating states of the component to the output signal; and generating, via the one or more processors, a continuous rank of the health condition of the component based at least on comparing the output signal to the one or more known operating states.

20. The method of one or more of these clauses, wherein generating the continuous rank comprises a numerical analysis of estimation within a range of discrete ranking scales of distress.

What is claimed is:

1. A system for monitoring a health condition of a component, the system comprising:

a sensor network comprising a transmitter and a plurality of receivers, the transmitter being located within a first region of the component, the plurality of receivers being located within a second region of the component, the first region being spaced from the second region;

a communications interface module; and a computing system comprising one or more memory devices and one or more processors, wherein the one or more memory devices is configured to store instructions that, when executed by the one or more processors, causes the one or more processors to:

transmit, via the transmitter, an electromagnetic signal from the first region and to the second region, the electromagnetic signal being transmitted through a third region of the component, the third region being defined by a body of the component formed between the first region and the second region;

determine which receiver of the plurality of receivers received the electromagnetic signal;

transmit, via the transmitter, and to the communications interface module an output signal indicative of an array of the plurality of receivers that received the electromagnetic signal; and determine the health condition based on the output signal to a nominal operating state of the component, wherein if two or more receivers of the plurality of receivers received the electromagnetic signal, the output signal is indicative of damage located within the third region.

2. The system of claim 1, wherein the electromagnetic signal obtains a spectroscopy of the component.

3. The system of claim 2, wherein the one or more processors is configured to:

determine the health condition based on comparing the output signal to a nominal operating state of the component.

4. The system of claim 3, wherein comparing the output signal to the nominal operating state comprises comparing the spectroscopy obtained by the electromagnetic signal to a nominal spectroscopy corresponding to the nominal operating state.

5. The system of claim 1, wherein the health condition comprises a magnitude and location of damage at the component within a distance between the transmitter and the plurality of receivers.

6. The system of claim 5, wherein the one or more processors is configured to:

generate a continuous rank of the health condition of the component based at least on comparing the health condition to a discrete ranking scale of distress.

7. The system of claim 6, wherein the discrete ranking scale of distress comprises one or more known operating states of the component, and wherein generating the continuous rank of the health condition comprises a numerical analysis of the health condition to the discrete ranking scale of distress.

8. The system of claim 1, wherein the sensor network is a near-field configuration of the transmitter and the plurality of receivers.

9. The system of claim 1, wherein:

the component is an airfoil comprising a body extending between a leading edge, a trailing edge, a root and a tip, the airfoil having a suction side and a pressure side;

the first region corresponds to at least a portion of the leading edge;

the second region corresponds to at least a portion of at least one of the root, the tip, or the trailing edge; and the third region corresponds to the body.

10. A gas turbine engine, the gas turbine engine comprising:

a component comprising an outer surface and a plurality of layers of material, the outer surface covering one or more layers of the plurality of layers of material;

a sensor network positioned along at least one layer of the plurality of layers of material and being covered by the outer surface, the sensor network comprising a transmitter and a plurality of receivers, the transmitter being located within a first region of the component, and the plurality of receivers being located within a second region of the component, the first region being separate from the region; and a computing system comprising:

a communications interface module; and one or more memory devices and one or more processors, wherein the one or more memory devices is configured to store instructions that, when executed by one or more processors, causes the one or more processors to:

transmit, via the transmitter, an electromagnetic signal from the first region and to the second region, the electromagnetic signal being transmitted through a third region of the component between the first region and the second region;

determine which receiver of the plurality of receivers received the electromagnetic signal;

transmit, via the transmitter, and to the communications interface module an output signal indicative of an array of the plurality of receivers that received the electromagnetic signal; and determine a health condition based on comparing the output signal to a nominal operating state of the component, wherein if two or more receivers of the plurality of receivers received the electromagnetic signal, the output signal is indicative of damage located within the third region.

11. The gas turbine engine of claim 10, wherein the component is an airfoil comprising a leading edge, a trailing edge, a root, and a tip, and wherein the transmitter is positioned at a first region comprising one or both of the leading edge and the root, and wherein the plurality of receivers is positioned at a second region comprising one or both of the trailing edge and the tip.

12. The gas turbine engine of claim 10, wherein the component is a casing comprising a first region at an upstream end of the casing and a second region at a downstream end of the casing, and wherein the transmitter is positioned at the first region and the plurality of receivers is positioned at the second region.

13. The gas turbine engine of claim 10, wherein the component comprises composite fibers positioned in at least one layer of material, and wherein at least a portion of the transmitter, one or more of the plurality of receivers, or both, are positioned at the composite fibers.

14. The gas turbine engine of claim 13, wherein the component comprises an energy harvesting fiber at the composite fibers, and wherein the energy harvesting fiber is operably coupled to the transmitter, the plurality of receivers, or both, to provide energy to the sensor network.

15. The gas turbine engine of claim 10, wherein the sensor network is a near-field configuration of the transmitter and the plurality of receivers.

16. The gas turbine engine of claim 10, wherein the electromagnetic signal obtains a spectroscopy of the component, and wherein comparing the output signal to the nominal operating state comprises comparing the spectroscopy obtained by the electromagnetic signal to a nominal spectroscopy corresponding to the nominal operating state.

17. A computer-implemented method for monitoring a health condition of an engine component being one of an airfoil, a strut, or a casing of an engine, the method comprising:

transmitting, via one or more transmitters positioned at a first region of the engine component, an electromagnetic signal to a respective receiver of a plurality of receivers, the plurality of receivers being located within a second region, spaced from the first region, of the engine component, the electromagnetic signal being transmitted through a third region of the engine component, the third region being defined by a body of the engine component formed between the first region and the second region;

determining which receiver of the plurality of receivers receive the electromagnetic signal;

transmitting, via the one or more transmitters, and to a communications interface module, an output signal indicative of an array of the plurality of receivers that received the electromagnetic signal; and determining, via one or more processors of a computing system, the health condition based on comparing the output signal to a nominal operating state of the engine component, wherein if two or more receivers of the plurality of receivers received the electromagnetic signal, the output signal is indicative of damage located within the third region.

18. The method of claim 17, further comprising obtaining, via the electromagnetic signal, a spectroscopy of the engine component, wherein the determining comprises comparing, via the one or more processors, the spectroscopy obtained by the electromagnetic signal to a nominal spectroscopy corresponding to the nominal operating state.

19. The method of claim 17, wherein the determining comprises comparing, via the one or more processors, one or more known operating states of the engine component, including the nominal operating state, to the output signal and further comprising generating, via the one or more processors, a continuous rank of the health condition of the engine component based at least on comparing the output signal to the one or more known operating states.

20. The method of claim 19, wherein generating the continuous rank comprises a numerical analysis of estimation within a range of discrete ranking scales of distress.

* * * * *